(12) United States Patent
Lefgren (10) Patent No.: US 7,695,078 B2
(45) Date of Patent: Apr. 13, 2010

(54) CARBIDE STUDS FOR STABILITY AND MOTIVE TRACTION OF FOOTWEAR

(76) Inventor: James Lefgren, 460 South State, Richmond, UT (US) 84333

( * ) Notice: Subject to any disclaimer, the term of this patent is extended or adjusted under 35 U.S.C. 154(b) by 37 days.

(21) Appl. No.: 12/046,444

(22) Filed: Mar. 11, 2008

(65) Prior Publication Data

US 2008/0148601 A1    Jun. 26, 2008

Related U.S. Application Data

(63) Continuation of application No. 11/086,089, filed on Mar. 21, 2005, now abandoned.

(60) Provisional application No. 60/554,484, filed on Mar. 19, 2004.

(51) Int. Cl.
B65G 15/44 (2006.01)
A43B 5/00 (2006.01)

(52) U.S. Cl. .................... 305/180; 305/160; 152/210; 36/127

(58) Field of Classification Search .................. 305/180, 305/160–162, 192; 152/210–211; 36/59 R, 36/127
See application file for complete search history.

(56) References Cited

U.S. PATENT DOCUMENTS

| | | | | |
|---|---|---|---|---|
| 862,435 A * | 8/1907 | Bartel | ......................... | 152/210 |
| 3,124,191 A * | 3/1964 | Forslund | ..................... | 152/210 |
| 3,717,189 A * | 2/1973 | Gutshell | ..................... | 152/210 |
| 3,894,575 A * | 7/1975 | Baum | .......................... | 164/97 |
| 5,897,177 A * | 4/1999 | Bergstrom | ................. | 305/160 |
| 5,909,945 A * | 6/1999 | Noy | .............................. | 36/7.6 |
| 6,167,641 B1 * | 1/2001 | McMullin | .................... | 36/127 |
| 6,502,332 B1 * | 1/2003 | Nakayama | ................... | 36/134 |
| 2005/0269878 A1 * | 12/2005 | Lefgren | ..................... | 305/180 |

* cited by examiner

*Primary Examiner*—Jason R Bellinger
(74) *Attorney, Agent, or Firm*—Briggs and Morgan, P.A.

(57) ABSTRACT

The present invention provides a traction device for a terrain engaging element. The traction device defines a stud having a head portion and a shank portion extending from the head portion and adapted to be secured into the terrain engaging element. A plurality of spherical carbide pellets are bonded together on and to surfaces of the head. The carbide pellets are provided in multiple layers extending across the head surface. The carbide pellets are provided in a stacked relationship to each other so that during use the carbide pellets are capable of being individually dislodged to reveal a carbide pellet of an underlying layer.

20 Claims, 12 Drawing Sheets

CARBIDE STUDS FOR STABILITY AND MOTIVE TRACTION OF FOOTWEAR

RELATED APPLICATIONS

This application is a continuation of Ser. No. 11/086,089, filed Mar. 21, 2005, which claims the benefit of priority pursuant to 35 USC §119 of U.S. provisional application Ser. No. 60/554,484, filed Mar. 19, 2004, both of which are incorporated in their entirety by reference herein.

TECHNICAL FIELD

This invention relates generally to carbide traction devices for improving stability and traction, and more particularly to a traction device for improving stability and traction of footwear and other terrain engaging elements suitable for traversing rivers, snow, ice, or other slippery surfaces.

BACKGROUND OF THE INVENTION

Examples of footwear suitable for outdoor use over adverse terrain such as snow, ice, mud, rocks, etc., are well known. Accessory devices for such footwear are also known. Hobnails, screws and studs are examples of such accessory devices. Each of these accessory devices include significant limitations of use. Hobnails have been inserted into the soles of shoes or boots to prevent wear and improve traction. Hobnails are typically short nails which tend to quickly wear on rock surfaces and are often inadvertently removed during use in mud, moss, rocks and ice. Metal screws have also been used to improve traction in footwear. In a typical application, one or more metal screws are secured into a shoe sole. Metal screws typically wear relatively quickly and, once worn, tend to slide on surfaces leading to a decrease in traction across certain flat surfaces such as concrete floors, etc. Other examples of footwear suitable for outdoor use in water and rocks include felt and treaded rubber soles.

Tire studs, which may include carbide or porcelain studs, have been used to improve the traction of vehicles. In a typical application, a single generally cylindrical carbide element is secured within an aluminum housing. Porcelain studs are relatively brittle and may be damaged by ground impact. One limitation of tires studs is the propensity of the carbide or porcelain stud element to round over. In certain applications, the rounded-over element may lead to a decrease in traction, such as on concrete floors or other flat surfaces.

U.S. Pat. No. 5,897,177 to Bergstrom discloses a stud having a multifaceted surface for use on a tread element. The stud includes a body portion including a head and an elongated shank portion extending from the head. A mound of shard-like particles of a hard and durable material is bound together on and to the head of the stud such that the mound of particles has a multifaceted surface including multiple points which can engage the terrain. One limitation of the studs according to Bergstrom is the tendency of the particles to fracture during use due to the relatively few contact points defined by the sharp edges of the particles. The carbide fractures are typically uncontrolled and relatively large portions of the particles may be shed during a fracture. Because of the tendency of shedding relatively large particle portions, Bergstrom's device is believed to wear relatively quickly leading to poor economy of use. Additionally, the sharp edges of these studs may have a tendency to catch or snag on certain surfaces, such as carpet, which may lead to a tripping hazard. Furthermore, the relatively few contact points result in high contact forces which may be damaging to certain floors, such as wood and tile floors.

Accordingly, despite the attempts to develop improved devices for improving traction on adverse surfaces, there remains a need for an improved stud-style carbide traction device.

BRIEF SUMMARY OF THE INVENTION

A traction device according to the present invention includes a head adapted to be secured to a terrain engaging element, such as footwear, tires, flexible vehicle tracks, horse shoes, etc. In one example, a plurality of generally equally sized spherical carbide pellets are provided on a surface of the head in a stacked and layered orientation. During use, as carbide particles wear and become dislodged, an underlying carbide particle is revealed for subsequent contact with adverse terrain.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 9Aa is an enlarged portion of FIG. 9 indicated by C9A in FIG. 9.

DETAILED DESCRIPTION OF THE INVENTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present invention generally relates to a stud having an impressioned surface defined by multiple spherical carbide pellets that can penetrate terrain and thereby provide improved traction. The spherical carbide pellets are provided in multiple layers across an engaging surface of the stud. The impressioned stud surface of the present invention offers numerous advantages over conventional studs having a single or multifaceted carbide points. For example, instead of a single traction point, the impressioned stud surface of the present invention provides multiple traction points which improve the stud's grip on the terrain. The multiple traction points also allow the forces acting on the stud to be distributed across multiple contact points. This reduces the magnitude of the forces that are acting on the individual points and makes the stud of the present invention more resistant to wear. In addition, as the impressioned surface of the stud wears, it continues to present underlying pellets thereby ensuring that that stud continues to provide excellent traction over time. The stud of the present invention can be used to improve the traction of any type of tread element or other terrain engaging element and is particularly well suited for use on the treads of shoes, boots or other footwear. Human and other animal use is envisioned. For example, use of the studs of the present invention to secure a horse shoe is envisioned. Additionally, the stud of the present invention may be utilized on tires or endless tracks of vehicles such as snowmobiles, construction equipment, excavating equipment and snow removal equipment.

Figures 1, 2, 3, 4:
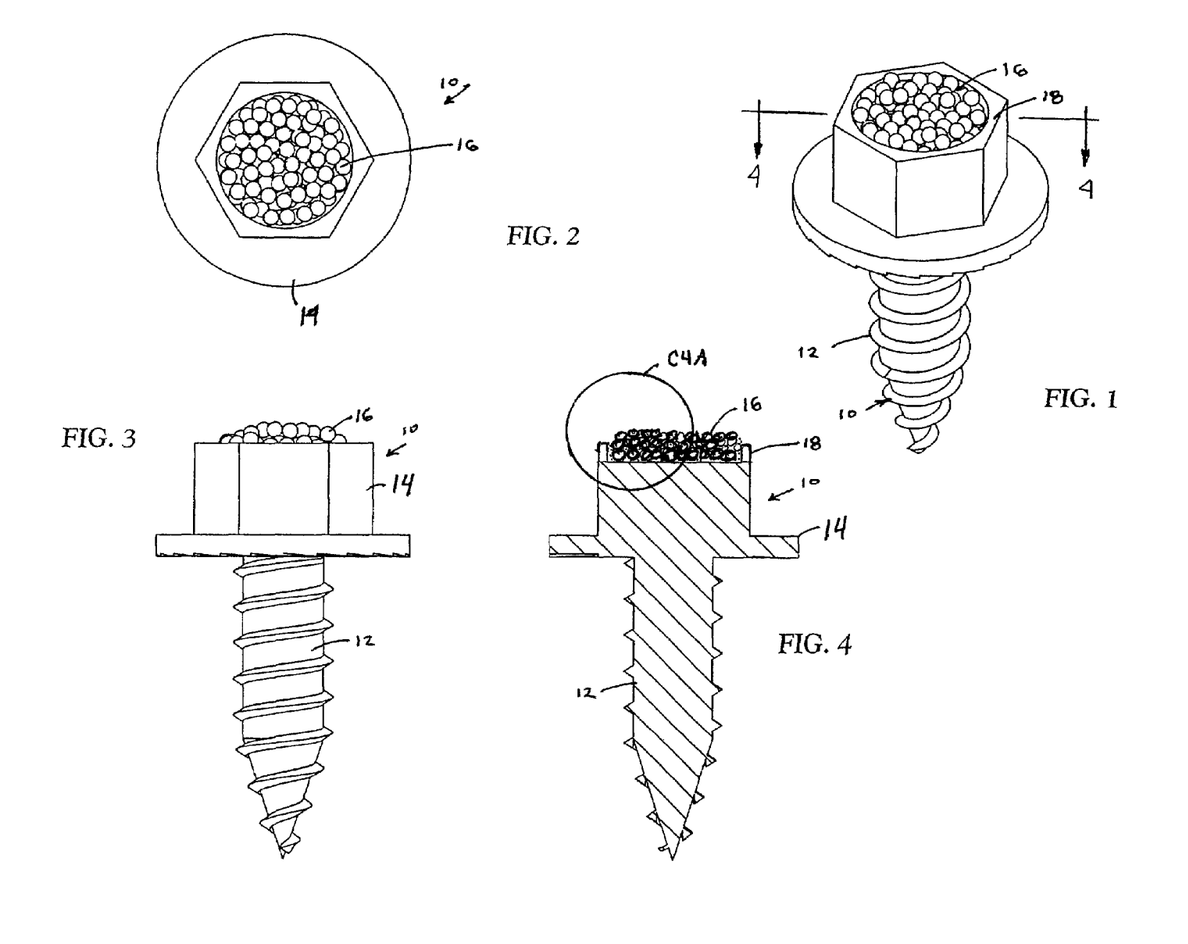
FIG. 1 representatively shows a perspective view of an example of a traction device according to the present invention.
FIG. 2 is a top plan view of the traction device of FIG. 1.
FIG. 3 is a side elevational view of the traction device of FIG. 1.
FIG. 4 is a cross-sectional view of the traction device of FIG. 1 taken along lines 4-4.
Figure 4A:
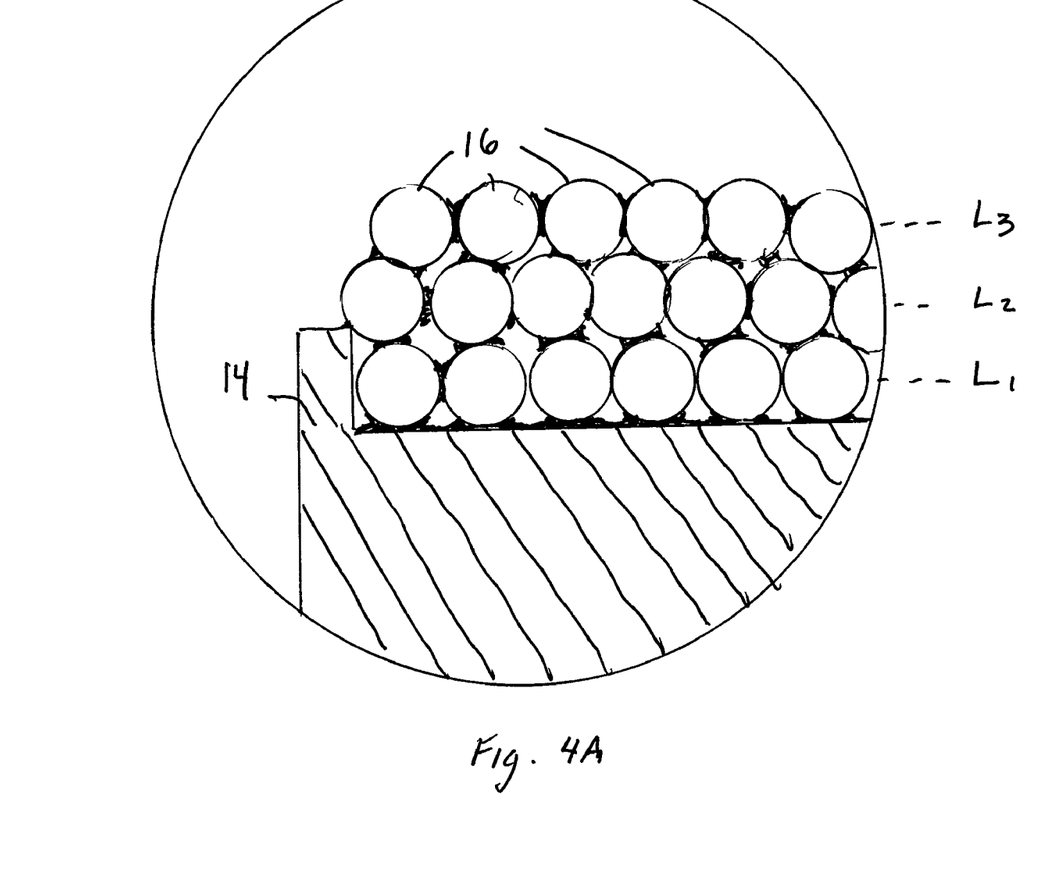
FIG. 4a is an enlarged portion of FIG. 4 indicated by C4A in FIG. 4.
Figure 5:
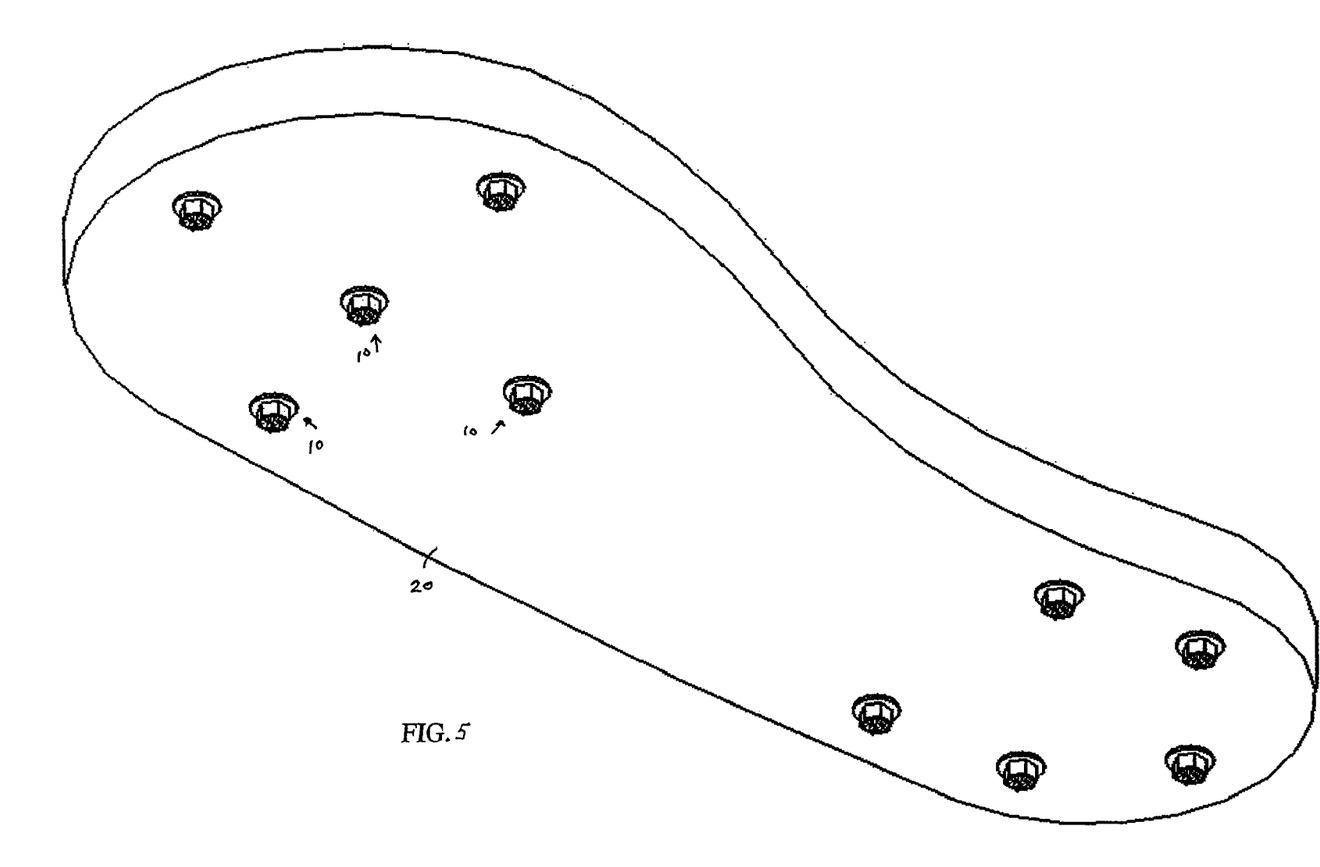
FIG. 5 is a perspective view of a plurality of traction devices of FIG. 1 secured to a footwear sole.
Figure 6:
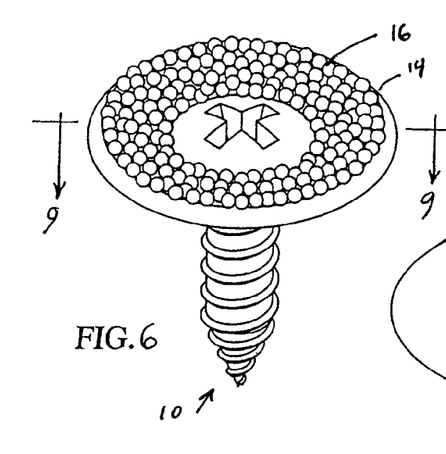
FIG. 6 representatively shows a perspective view of another example of a traction device according to the present invention.
Figure 7:
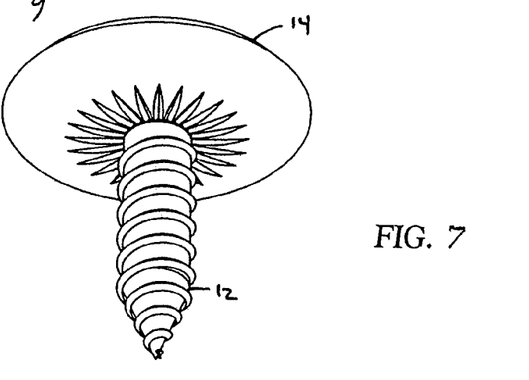
FIG. 7 is another perspective view of the traction device of FIG. 6.
Figure 8:
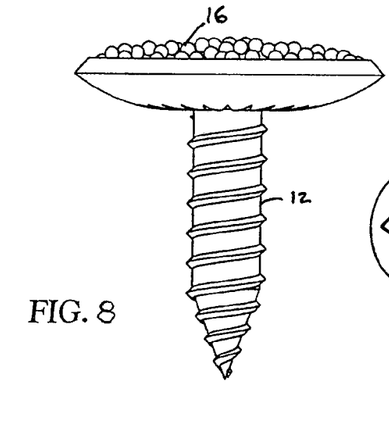
FIG. 8 is a side elevational view of the traction device of FIG. 6.
Figure 9:
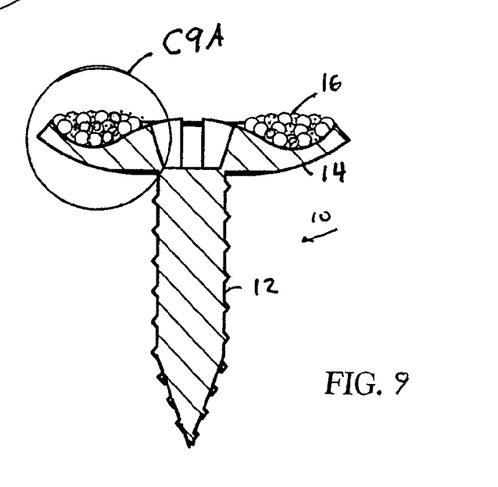
FIG. 9 is a cross-sectional view of the traction device of FIG. 6 taken along lines 9-9.
Figure 9A:
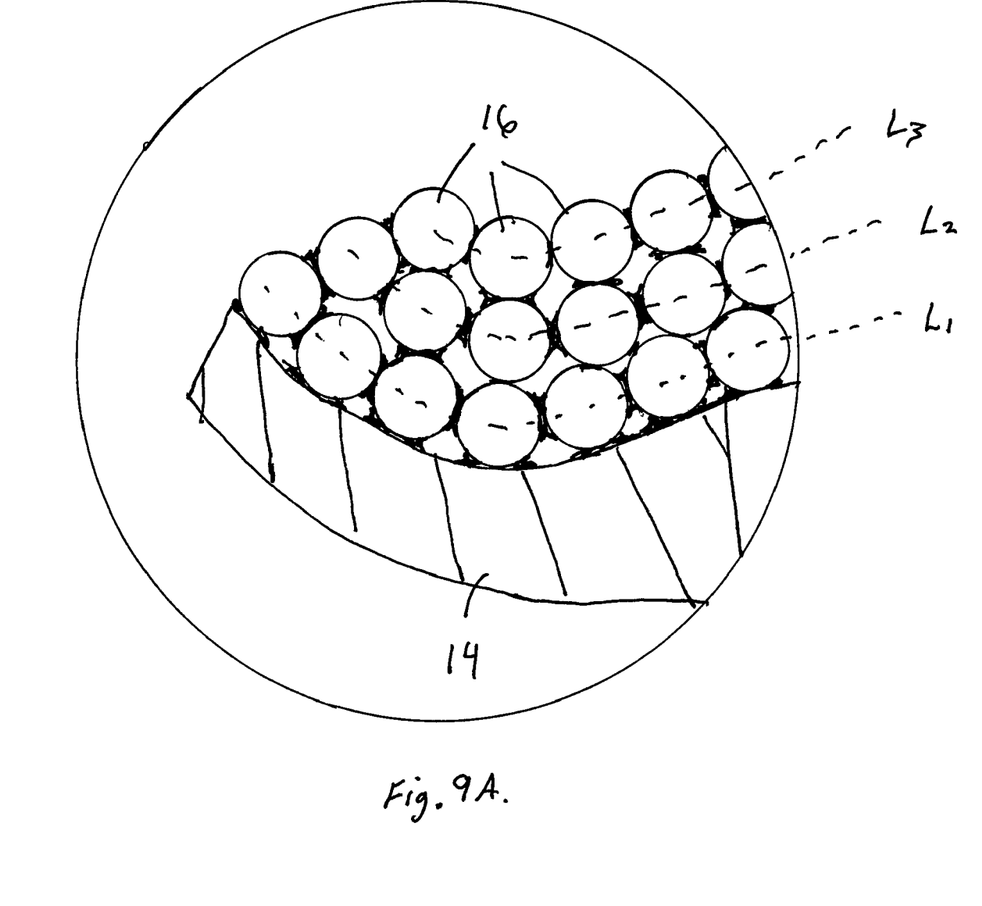

FIGS. 1-5 illustrate a tungsten-carbide tipped stud-type traction device 10 example according to the present invention. In this example, carbide tipped stud 10 includes shank 12, head 14, and a multiplicity of substantially spherical, tungsten-carbide pellets 16. Shank 12 and head 14 may be mild steel, forged steel, or stainless steel, or any other type of known material capable of being brazed. As shown in FIGS. 4 and 9, pellets 16 are provided in multiple layers extending across the engaging surface of the stud 10. In the embodiment of FIG. 1, a mound of pellets 16 are surrounded by wall 18 for holding and positioning pellets 16 on top of head 14. In this embodiment, pellets 16 may be welded or brazed together and to the head 14 of the stud 10, with brass or bronze or silver and a flux mixture. As shown in FIG. 4A, which is an enlarged portion of FIG. 4 indicated by a circle designated, C4A, pellets 16 define multiple layers, L1, L2, L3 upon the surface of head 14. As pellets 16 are similarly sized, the average number of pellets per layer remains constant across multiple layers. FIG. 5 represents one example of a sole 20 of a boot including a plurality of the studs 10. The arrangement and number of studs 10 may be varied to increase traction.

Figures 10, 11, 12:
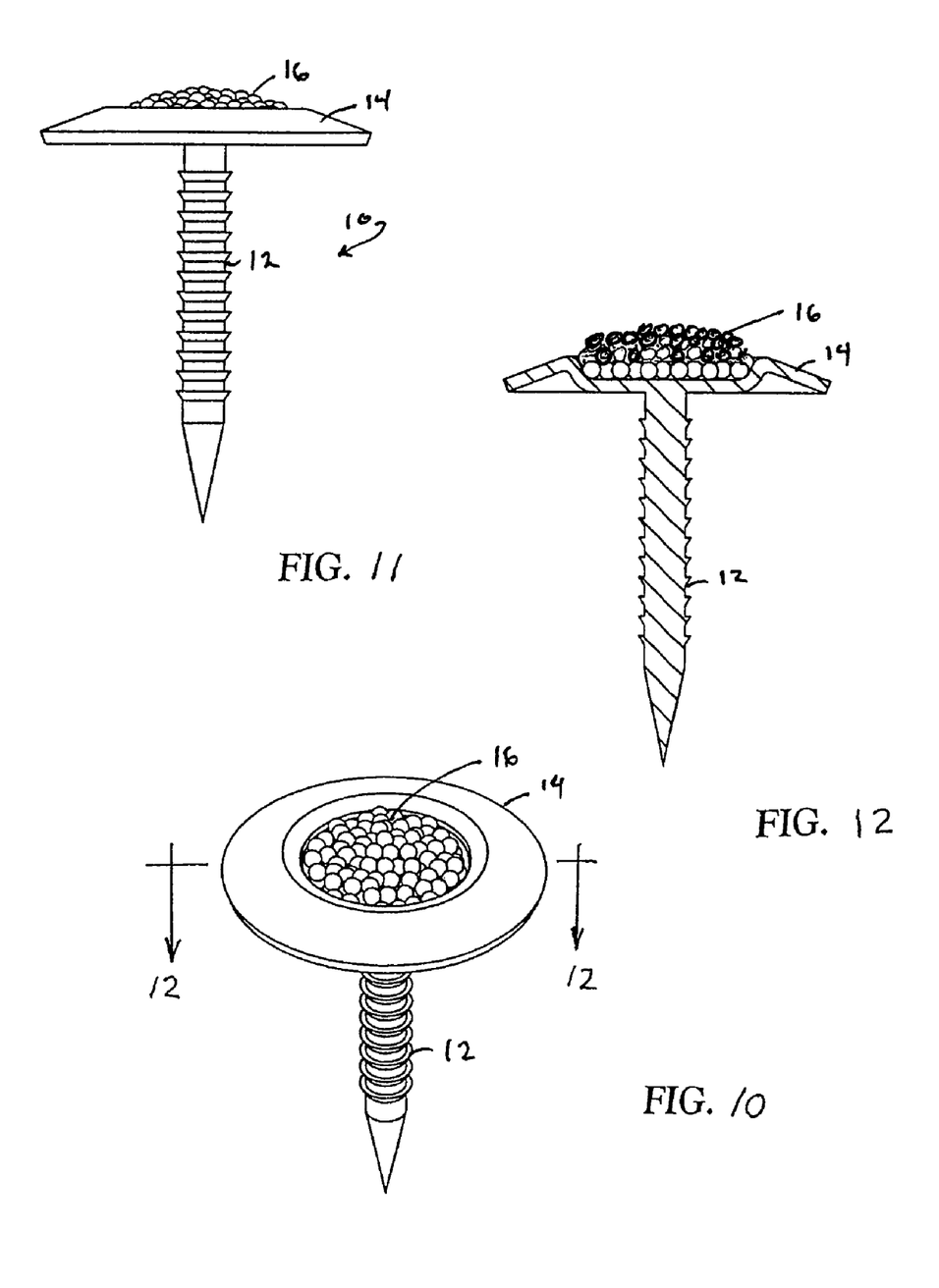
FIG. 10 representatively shows a perspective view of another example of a traction device according to the present invention.
FIG. 11 is a side elevational view of the traction device of FIG. 10.
FIG. 12 is a cross-sectional view of the traction device of FIG. 10 taken along lines 12-12.
Figures 13, 15, 17, 18:
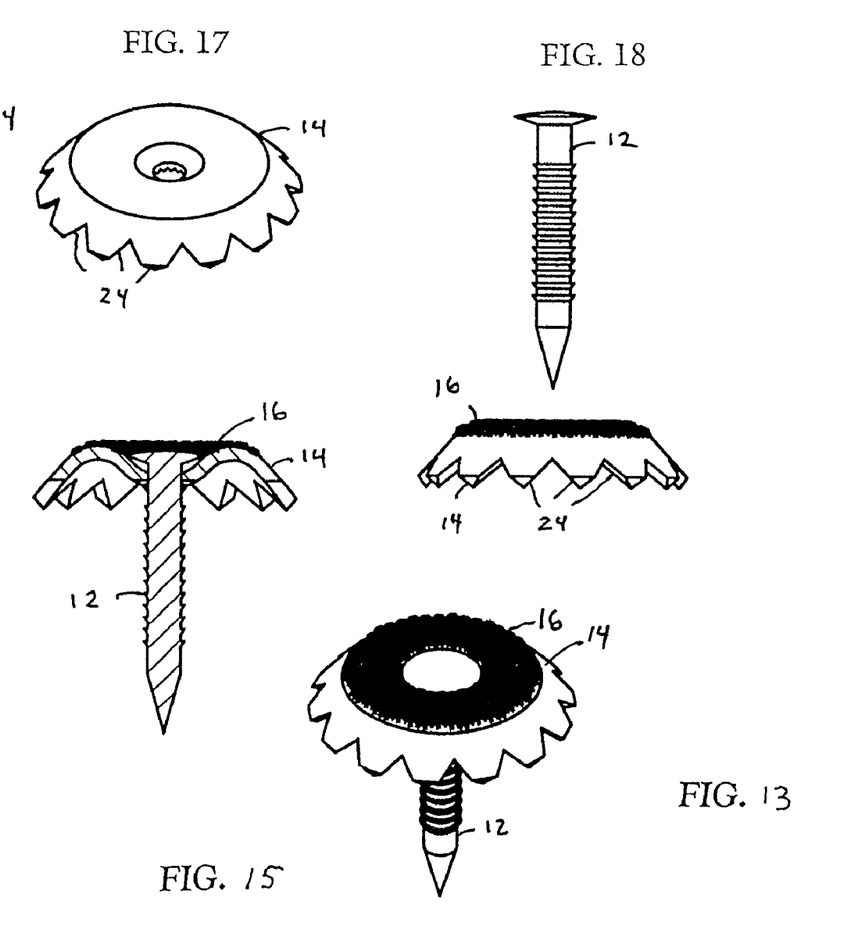
FIG. 13 representatively shows a perspective view of another example of a traction device according to the present invention.
FIG. 15 is a cross-sectional view of the traction device of FIG. 13 taken along lines 15-15.
FIG. 17 is a perspective view of a head portion of the traction device of FIG. 13.
FIG. 18 is a side perspective view of the traction device of FIG. 13 shown in a disassembled state.
Figure 14:
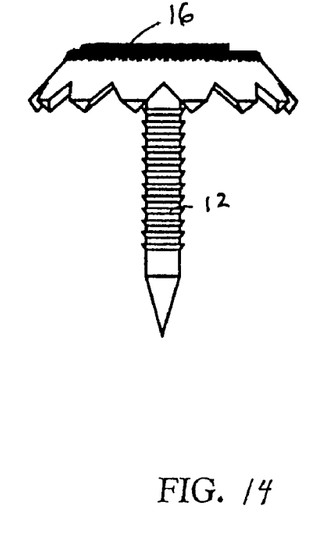
FIG. 14 is a side elevational view of the traction device of FIG. 13.
Figure 16:
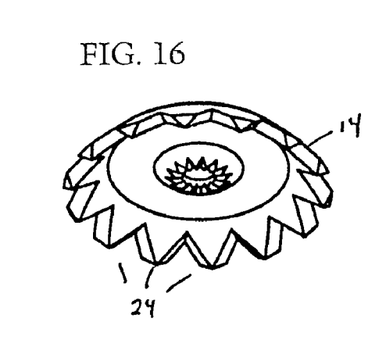
FIG. 16 is a perspective view of a head portion of the traction device of FIG. 13.

FIGS. 6-12 illustrate other examples of a tungsten-carbide tipped stud 10 according to the present invention. In these embodiments, the carbide tipped stud 10 includes shank 12, head 14, and a multiplicity of substantially round, tungsten-carbide pellets 16. The shank 12 and head 14 may be mild steel, forged steel, or stainless steel, or any other type of known material capable of being brazed. In the embodiment of FIGS. 6-12, the pellets 16 may be contained with a concave depression formed on a top surface of head 14 for holding and positioning the pellets 16 on top of the head 14. In the embodiment of FIGS. 6-9, the shank 12 includes a threaded element allowing the stud 10 to be secured into the sole of a boot, etc. In the embodiment of FIG. 10-12, the shank 12 includes a plurality of rings adapted to engage and hold the stud 10 in boot sole, etc. As shown in FIG. 9A, which is an enlarged portion of FIG. 9 as indicated by the circle designated, C94, the layers L1, L2, L3 of pellets 16 conform to the curved surface of head 14.

The studs 10 of FIGS. 10-12 may be applied by hand force or may be secured into a boot or other device with a hammer, etc. The shaft 12 may be barbed and configured to be easily pushed into a sole of a shoe or boot and possibly removed at a later time. This allows users to temporarily insert the stud 10 when there may be ice on the ground, or when the user simply desires improved traction. Elderly and young children may find this feature particularly attractive.

Head 14 may be provided with one or more edges for engaging a boot sole or other element into which the stud 10 is secured. For example, in the embodiment of FIGS. 13-18, a plurality of serrated edges 24 are defined along the perimeter of head 14. Similarly, in the embodiment of FIGS. 19-21, a plurality of edges 42 are defined along the perimeter of head 14 and which are adapted to engage the boot sole, etc.

Figure 23:
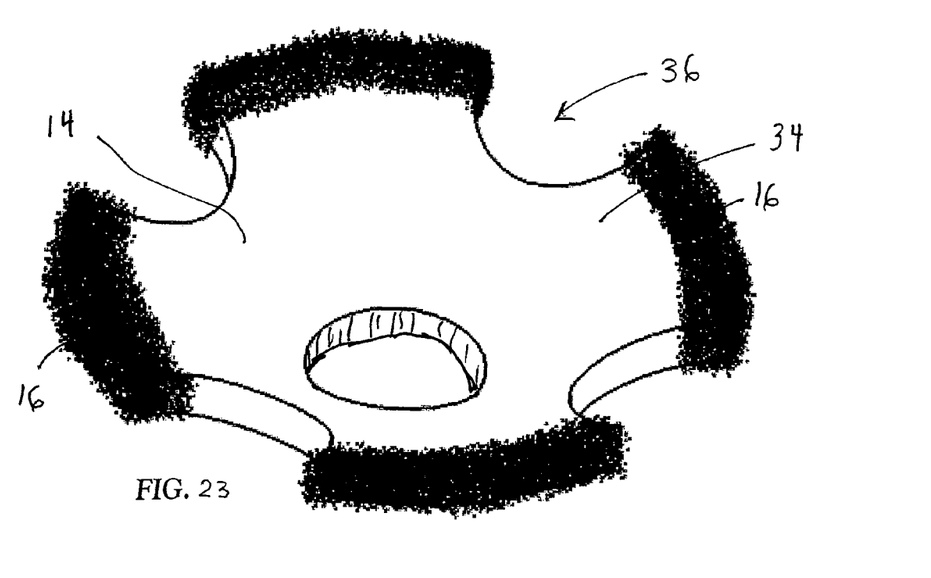
FIG. 23 representatively shows a perspective view of another example of a traction device according to the present invention.

FIGS. 13-21 and 23 illustrate a washer-type stud 10 according to another embodiment of the present invention. The washer-type stud 10 may include a plurality of carbide pellets 16 that extend radially from head 14. In the embodiment of FIG. 23, head 14 may be stamped to comprise a plurality of extension portions 34 receiving carbide pellets 16 to provide greater traction. In certain embodiments, the extension portions 34 define a plurality of notches 36. When the stud 10 is secured to a sole, the extensions 34 and notches 36 engage portions of the sole and prevent the stud 10 from spinning loose. In one particular application, the extensions 34 protrude from the sole of the boot with other portions of head 14 being recessed into the sole. The extensions 34 also act to secure the washer-type stud 10 to the sole of the boot by preventing the washer-type stud 10 from deflecting or rotating. In certain applications, portions of the sole engage the notches 36 formed between the extensions 34 and prevent the washer-type stud 10 from spinning loose.

Figure 19:
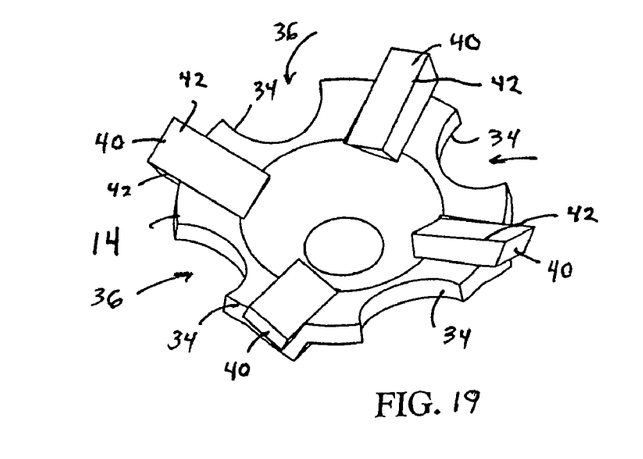
FIG. 19 representatively shows a perspective view of another example of a traction device according to the present invention.
Figure 20:
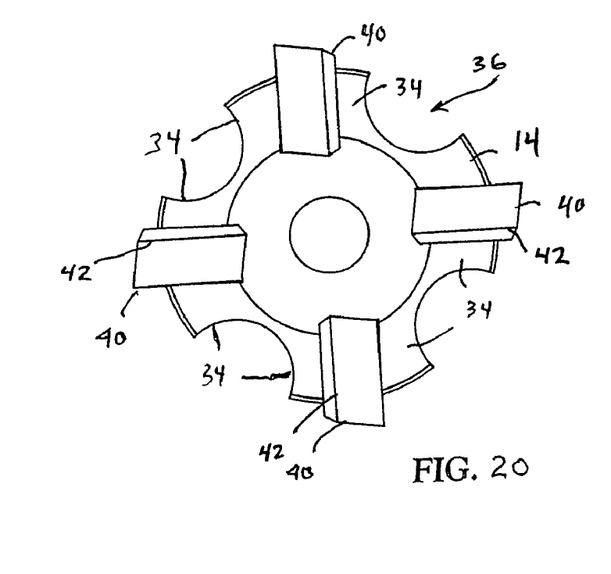
FIG. 20 is a top plan view of the traction device of FIG. 19.
Figure 21:
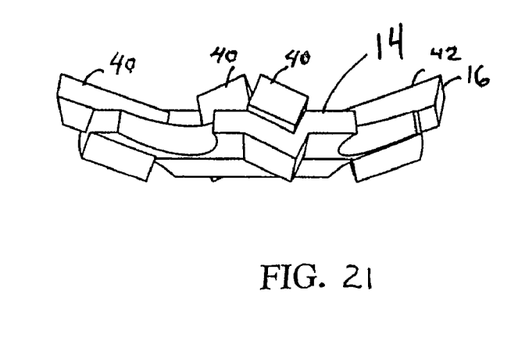
FIG. 21 is a side elevational view of the traction device of FIG. 19.
Figure 22:
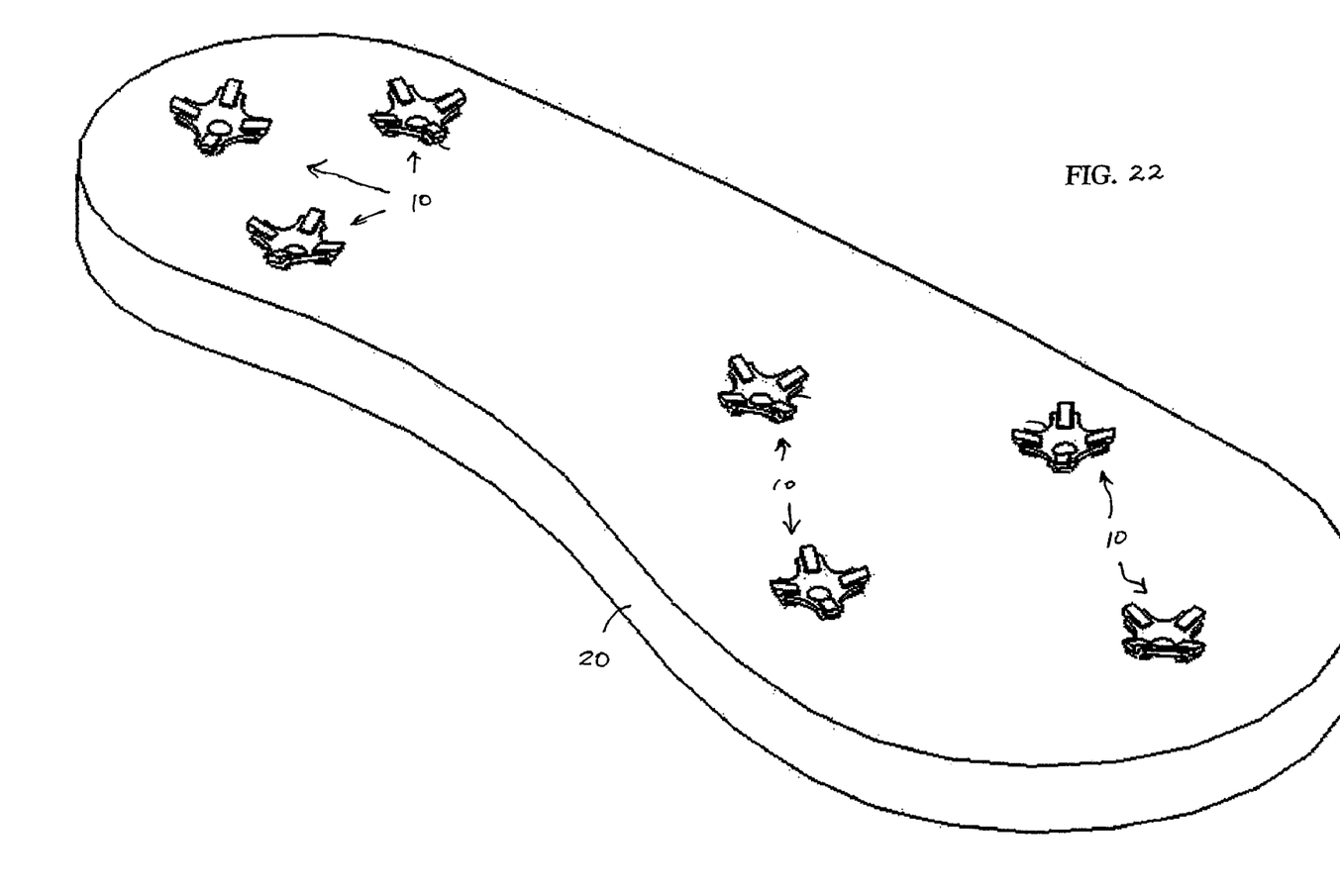
FIG. 22 illustrates a plurality of traction devices of FIG. 19 secured to a footwear sole.
Figure 24:
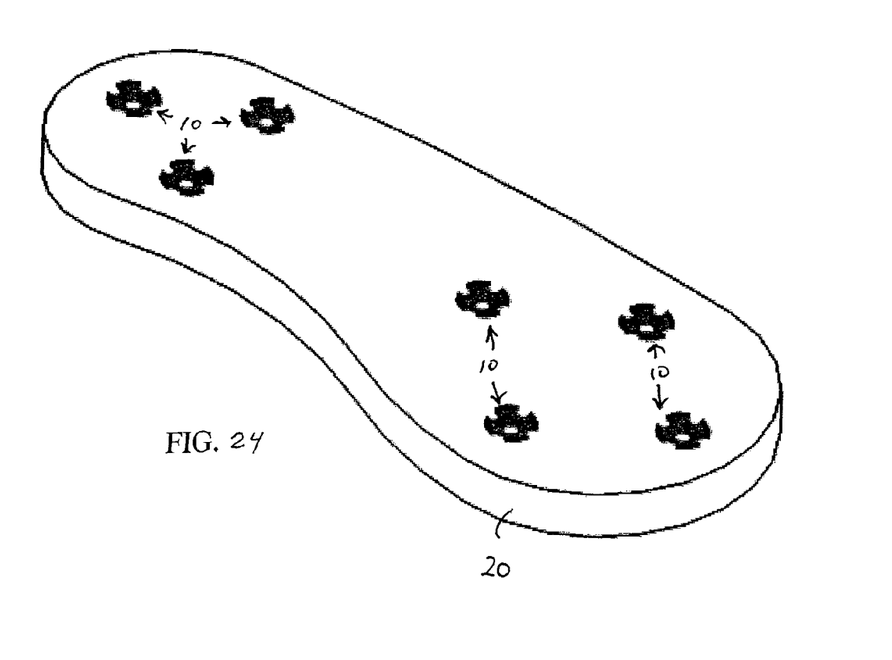
FIG. 24 illustrates a plurality of traction devices of FIG. 23 secured to a footwear sole.

FIGS. 19-21 illustrate relatively large carbide elements 40 upon head 14. Pellets 16 (not shown) may be located on surfaces of head 14. In this embodiment, carbide particles 40 may define a plurality of discrete edges 42 adapted to engage terrain. Additionally, carbide elements 40 can be secured to head 14 in a variety of different orientations. FIG. 22 illustrates the studs of FIGS. 19-21 secured into a boot sole 20. FIG. 24 illustrates the stud 10 of FIG. 23 secured into a boot sole 20.

Figure 25:
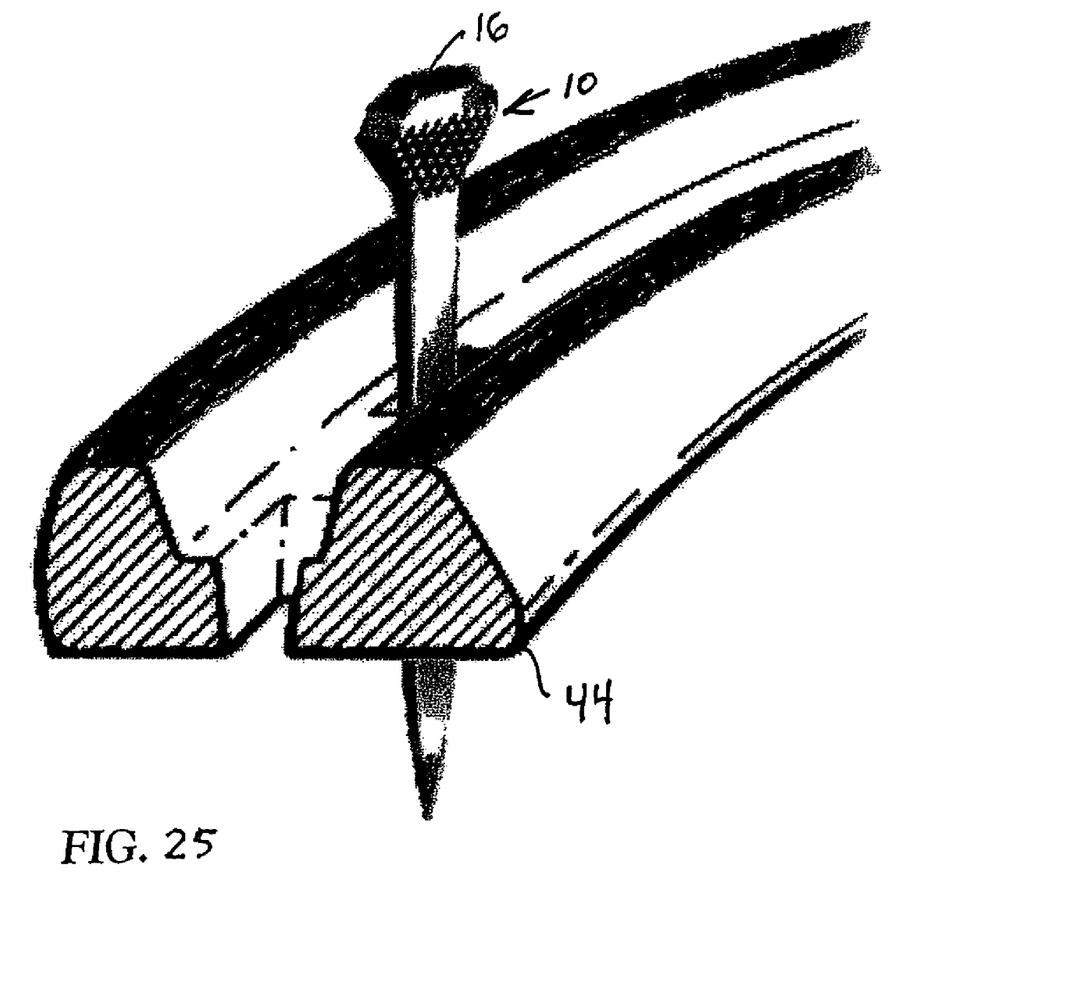
FIG. 25 representatively shows a perspective view of another example of a traction device according to the present invention utilized to secure a horse shoe.

FIG. 25 illustrates yet another application of the present invention wherein the stud 10 is used to secure a horse shoe 44. Stud 10 may define one or more shoe nails used to secure the shoe 44. In use, the stud 10 provides increased traction to a horse as the carbide particles 14 are adapted to engage the terrain. Other uses of such a stud 10 may be appreciated by those of ordinary skill in the arts.

Those of ordinary skill in the art would appreciate a variety of different welding or brazing approaches to securing the pellets 16 to head 14. One preferred approach is disclosed herein. A process of welding tungsten-carbide to mild steel, forged steel, and stainless steel, or other known material, with a brazing mixture may be used to secure pellets 16 to head 14. In one embodiment, the brazing mixture may comprise either approximately 60% powdered brass or 60% powdered bronze and 40% flux and enough water to form a paste. Distilled water is recommended so as to minimize contaminates in the brazing mixture. It is preferable to use brass for brazing the pellets 16 to the underlying metal because brass provides a stronger bond than bronze. A person skilled in the art would understand that the type of flux to be used depends on the type of brazing metal used. For instance, a typical flux for brass is Superior Flux 609LB, which may be purchased at any welding shop. Other types of flux are specific to bronze and silver. It is recognized that all appropriate brazing metals and the corresponding flux may be used.

After the metal parts have been cleaned, the paste may be applied to all surfaces that are to be bonded to the pellets 16, in this case, the paste should be applied to the head 14 of the stud 10. The pellets 16 may be poured over the paste, the metal piece including the paste may be dipped into the pellets 16, the pellets 16 may be placed onto the paste, or the pellets 16 may be positioned onto the paste into a predetermined configuration. For best results, pellets 16 with a mesh size of between 16 and 32 are preferable. Spherical pellets 16 within the range of 16 to 32 mesh size have been found particularly useful in cutting through moss, snow, ice and mud.

The flux mix is then air dried or oven cured at approximately 100 degrees Fahrenheit, until all moisture has dissipated. The four ingredients (metal, brass, carbide pellets 16, and paste) may be heated together at a temperature range from 1800 degrees Fahrenheit to 2000 degrees Fahrenheit, and a temperature range of 1400 degrees Fahrenheit to 1900 degrees Fahrenheit for bronze or silver. When the paste begins to separate, the brass/bronze mixture begins bonding the metal to the carbide pellets 16. Ideally, this process should not exceed three minutes. It is recognized, however, that many factors affect the ideal heat and time frame for bonding. For instance, it is recognized that changes in brazing metals, humidity, altitude, and size and number of parts may affect the heating temperature and the heating time.

Figure 26:
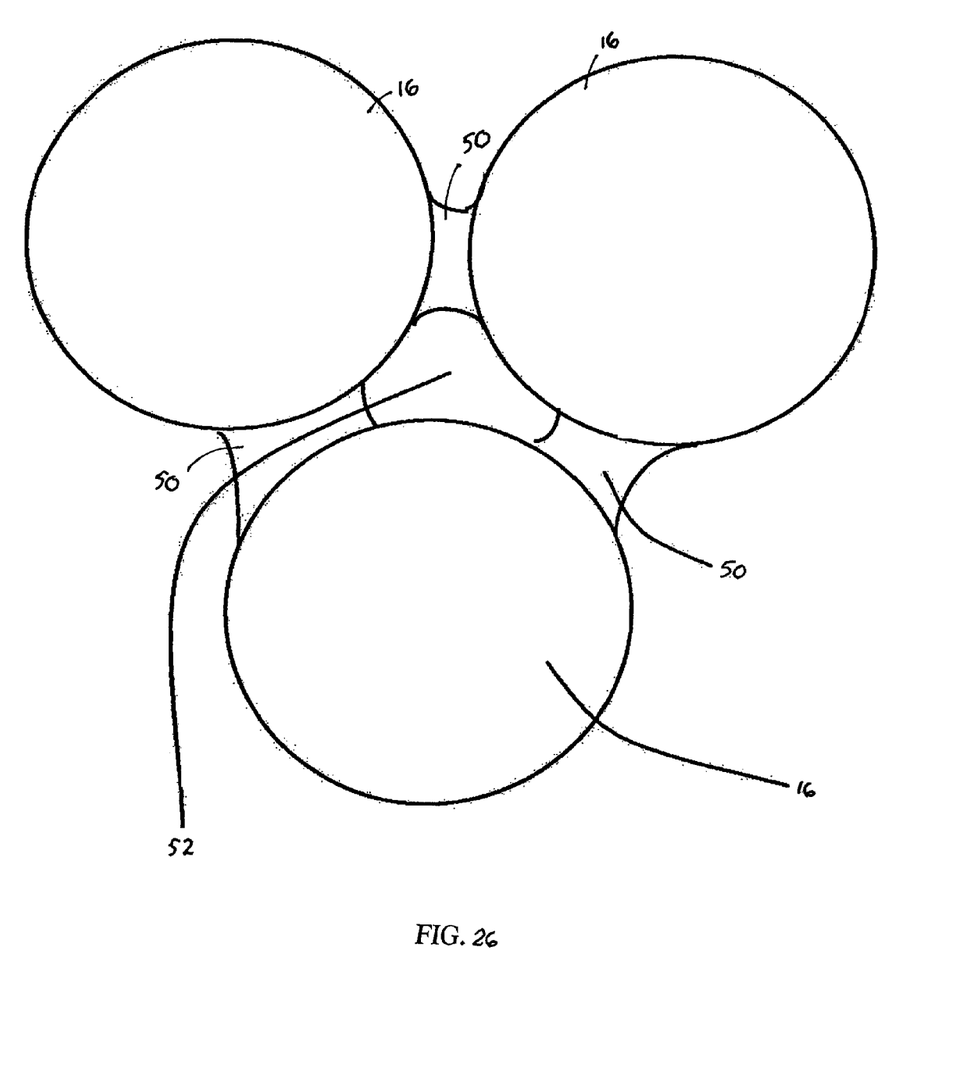
FIG. 26 representatively illustrates one type of bonding that may occur between carbide pellets in traction devices according to the present invention.

Once the pellets 16 have bonded to the head 14, stud 10 is cooled to room temperature, preferably away from contaminates. As shown in FIG. 26, the pellets 16 form excellent bonds through brazing, and just as important, pellets 16 are capable of bonding to a multiplicity of other pellets 16. FIG. 26 generally illustrates a bond, or wicking 50 that forms between adjacent pellets 16. The thickness of the wicking 50, and therefore the strength of the bond between the bonded pellets 16 depends on how close the pellets 16 are to each other at the time of the bond. In general, pellets 16 that are close together will generally have a stronger bond between them due to the thickness of the wicking 50. Voids 52 may form between the pellets 16. Because the pellets 16 are generally spherical in shape, more bonding occurs between adjacent pellets 16. When stacked into layers, interstices are defined as the areas between pellets 16. A brazing alloy or other alloy which fills these interstices is particularly useful.

In contrast to crushed, cut, or ragged pieces with sharp edges, a smooth spherical pellet 16 may bond to more pellets 16 because of the smooth surfaces and symmetrical shape. Higher bonding ratios increase overall wear and strength of the bond. It is noted that contaminates and oxidation may prevent the pellets 16 from bonding to the head 14. As used herein, the term "carbide" is broadly defined to include carbides, ceramics, silicon nitrides, cermets, another other known highly wear resistant materials such as HSS and cobalt.

In order to provide the stud 10 with multiple traction or gripping points, a multilayered mound of pellets 16 is attached to the ground-engaging surface of the stud 10. The pellets 16 which form the mound define an impressioned surface which includes a plurality of rounded surfaces which can engage the terrain thereby giving the stud 10 increased gripping ability as compared to conventional single point studs. Specifically, the mound comprises a plurality of pellets 16 of a tough wear resistant material such as carbide which are brazed or soldered together and to a surface of the stud 10 with a suitable binding material. Furthermore, the mound preferably comprises several layers of pellets 16 extending across the terrain engaging surface of stud 10. The impressioned surface which is provided by the mound of pellets 16 gives the stud 10 improved wear characteristics as compared to conventional single point studs or multifaceted studs which tend to shed relatively large portions of carbide. In particular, as opposed to the magnitude of the forces caused by the engagement of the stud with the terrain being applied on a single point or relatively few points of a multifaceted surface, the rounded pellets 16 allows the forces to be divided between multiple engagement surface thereby allowing the stud 10 to be more resistant to wear than conventional studs. The impressioned surface also enables the stud 10 to maintain a plurality of carbide contact surface even as it wears over time.

Specifically, as the individual pellets 16 which form an overlying layer wear or break off, the underlying layers of pellets 16 are exposed.

It is understood that the above-described arrangements are only illustrative of the application of the principles of the present invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the specification describes the use of a paste as a mixture, or filler, it is envisioned that powder may also be used. The distinct advantage of a powder form is the wide spectrum of available alloys. Similarly, the use of a coils or spools of wire, lengths of rod and filler metal strips is envisioned. Additionally, filler preforms may be used. Preforms are manufactured by forming bulk wire and strip into special shapes, which may be produced to form simple to intricate shapes and sizes. There are many advantages to preforms including the ability for alloy pre-placement in an automated setting. Automation increases overall production rate and allows the use of unskilled labor, both of which save time and money. Preforms also help minimize and standardize costs. Hand feeding filler metal may use up to 50% more alloy than actually necessary. Preforms are measured amounts of alloy ensuring the exact volume required is used every time. Aesthetically, preforms help improve a part's appearance. Preforms are designed to surround the joint providing a smooth look with only a thin line of alloy visible. Since the correct amount of alloy fills the joint area, this usually results in a reduction of rejected parts. Finally, the use of flux-coated forms. Some filler metal forms are available with a flux-coating. The advantage to these types of forms is that the final fluxing step is eliminated. The final cleaning step is easier as well with less contaminants going out with the rinsing water.

It is further envisioned that many other types of brazing metals may be used to braze the pellets 16 to the underlying head 14. Examples of brazing metals that may be used include, but are not limited to aluminum, gold, silver, nickel and ceramic to name a few. The shank may be threaded, barbed, studded, or ridged. The stud may be permanent in the boot, or it may be permanent to a strap-on or clip-on tread. The head may include a wall enclosing an area on the top, or it may be flat or convex or concave. It is further envisioned that the studs referenced to above may be compatible with any type of shoe, or traction device, including tires or tracked vehicles.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A traction device comprising:
    a head adapted to be secured to a footwear sole, with a lower surface adapted to engage a ground surface;
    a plurality of equally sized spherical carbide pellets arranged upon the lower surface of the head in a plurality of layers;
    a brazing metal extending within interstices between adjacent spherical carbide pellets to secure the pellets to the lower surface of the head; and
    a plurality of air voids extending between adjacent pairs of said plurality of carbide pellets and rendering said plurality of layers porous.

2. The traction device of claim 1 wherein the head is secured to a shank portion which is inserted into the footwear sole.

3. The traction device of claim 1 wherein the head and a shank portion are separable.

4. The traction device of claim 1 wherein the head includes a perimeter defined by a plurality of notches, with the plurality of spherical carbide pellets being arranged between each of said plurality of notches so as to define separated groupings of carbide pellets.

5. The traction device of claim 1 wherein the carbide pellets are between a 16 to 32 standard mesh size.

6. A traction device comprising:
    a head having a curved lower surface for ground engagement and an upper surface for engagement with a footwear sole, with a plurality of heads being provided upon said footwear sole to enhance traction;
    a plurality of equally sized spherical carbide pellets arranged in multiple curved layers upon the lower surface of the head, with each of said curved layers conforming to said curved lower surface of the head;
    a brazing metal extending within interstices between adjacent spherical carbide pellets to secure the plurality of pellets to the head; and
    a plurality of air voids extending between adjacent pairs of said plurality of carbide pellets and rendering porous said multiple curved layers of carbide pellets.

7. The traction device of claim 6 wherein the head is permanently secured to a shank portion.

8. The traction device of claim 6 wherein the head and a shank portion are separable.

9. The traction device of claim 6 wherein the head includes a plurality of notches defined around a perimeter of the head, with said plurality of spherical carbide pellets being separated into portions along a perimeter of the head.

10. The traction device of claim 6 wherein the carbide pellets are between a 16 to 32 standard mesh size.

11. The traction device of claim 6 wherein the spherical carbide pellets are arranged into distinct groupings of pellets.

12. The traction device of claim 6 wherein the head is generally circular and includes a plurality of extension portions defined between a plurality of notches around a head perimeter, and wherein the pellets encompass multiple sides of the head at said plurality of extension portions.

13. The traction device of claim 11 wherein the head includes rounded portions defining extensions, and wherein the groupings of carbide pellets are located at outer portions of the extensions.

14. A traction device comprising:
    a head defining an upper surface and a lower surface being adapted to engage a footwear sole, with said head defining a plurality of extension portions spaced from a center and separated by a plurality of notches;

a plurality of spherical carbide pellets bonded to the upper surface of the head, with the plurality of pellets being separated into distinct groupings at outer portions of said plurality of extension portions; and a plurality of air voids extending between adjacent pairs of said plurality of carbide pellets and rendering porous multiple layers of carbide pellets.

15. The traction device of claim 14 wherein the head is permanently secured to a shank portion.

16. The traction device of claim 14 wherein the carbide pellets are between a 16 to 32 standard mesh size.

17. The traction device of claim 14 further comprising a shank integrally formed with the head, said shank including threads to secure the traction device to the footwear sole.

18. The traction device of claim 1 wherein the spherical carbide pellets are arranged into distinct groupings of pellets.

19. The traction device of claim 18 wherein the head includes rounded portions defining extensions, and wherein the groupings of carbide pellets are located at outer portions of the extensions.

20. The traction device of claim 14 wherein the head and a shank portion are separable.

* * * * *